US011689079B2

(12) United States Patent
Zhao

(10) Patent No.: US 11,689,079 B2
(45) Date of Patent: Jun. 27, 2023

(54) FAN DEVICE FOR EXERCISE EQUIPMENT

(71) Applicant: Liyong Zhao, Xinzhou (CN)

(72) Inventor: Liyong Zhao, Xinzhou (CN)

(73) Assignee: Liyong Zhao, Xinzhou (CN)

( * ) Notice: Subject to any disclaimer, the term of this patent is extended or adjusted under 35 U.S.C. 154(b) by 0 days.

(21) Appl. No.: 17/412,279

(22) Filed: Aug. 26, 2021

(65) Prior Publication Data

US 2022/0407387 A1    Dec. 22, 2022

(30) Foreign Application Priority Data

Jun. 22, 2021    (CN) .......................... 202121391163.9

(51) Int. Cl.
*H02K 7/18* (2006.01)
*A63B 22/06* (2006.01)
*F04D 25/06* (2006.01)
*H02K 7/14* (2006.01)

(52) U.S. Cl.
CPC ....... *H02K 7/1846* (2013.01); *A63B 22/0605* (2013.01); *F04D 25/06* (2013.01); *H02K 7/14* (2013.01); *A63B 2225/00* (2013.01)

(58) Field of Classification Search
CPC ....................................................... H02K 7/14
See application file for complete search history.

(56) References Cited

U.S. PATENT DOCUMENTS

| 5,071,117 | A | * | 12/1991 | Mautner | A63B 22/0007 482/57 |
| 6,102,834 | A | * | 8/2000 | Chen | A63B 22/0605 280/281.1 |
| 2003/0064860 | A1 | * | 4/2003 | Yamashita | A63B 24/0087 482/8 |
| 2011/0118086 | A1 | * | 5/2011 | Radow | A63B 21/00196 482/5 |
| 2014/0274564 | A1 | * | 9/2014 | Greenbaum | A63B 21/225 482/5 |

* cited by examiner

*Primary Examiner* — Sean Gugger
(74) *Attorney, Agent, or Firm* — Nitin Kaushik

(57) ABSTRACT

The present disclosure relates to a field of door/window hardware accessories, in particular to a door/window pulley, a pulley device, and a door/window. The present disclosure provides the bearing and the anti-deformation metal ring that can be in contact with the track, the anti-deformation metal ring use rigidity itself to effectively avoid generating indentation, and the door/window pulley is also difficult to be pressed to cause deformation. Moreover, the inner part of the injection molded body is filled between the bearing and the anti-deformation metal ring, which not only well transfers pressure bore by the anti-deformation metal ring when load-bearing to the bearing, but also restores the anti-deformation metal ring after slight deformation by giving an outward elastic support to the anti-deformation metal ring using elasticity of the injection molded body.

4 Claims, 8 Drawing Sheets

FAN DEVICE FOR EXERCISE EQUIPMENT

TECHNICAL FIELD

The present disclosure relates to a fan device for exercise equipment, and belongs to a technical field of exercise equipment.

BACKGROUND

At present, exercise equipment in a market, such as dynamic bikes and exercise fit cars, do not have a fan device, so that people using the exercise equipment for aerobic exercise sweat a lot. This is especially true in a hot summer, where the wet whole body may bring the people a poor experience and a part of the people may have repulsive psychology. Some people use other floor fans to assist in cooling, but house space of the people brings a certain limitation. Most people have limited effective free space in their houses and the exercise fit car or exercise bikes have occupied a certain amount of the space, using the floor fans at the same time may cause more constraint. By means of market investigation, most people place the exercise fit cars or the exercise bikes on balconies, so that they can view outside their balcony windows while exercising. However, the balconies in commodity rooms are an area where air conditioner cannot be covered, and using the floor fans is limited by the space, thereby bringing a certain trouble to the people.

SUMMARY

In order to overcome defects of the prior art, the present disclosure provides a fan device for exercise equipment.

The present disclosure provides the fan device for exercise equipment, including a direct current generator, a rubber sleeve, a generator fixing component, a baffle, a left fixing component, a right fixing component, a direct current voltage stabilizer, a stabilizer connecting component, a direct current electric fan, an electric fan connecting component, and an electric fan connecting clip. A rotating shaft of the direct current generator is connected with the rubber sleeve, the direct current generator is connected with the generator fixing component, and the generator fixing component is connected with an extension end of the left fixing component through a bolt shaft and further capable of rotating. A first end of the right fixing component and a first end of the left fixing component are connected beside one side of a supporting rod of an exercise fit car through bolts and nuts, and a second end of the right fixing component and a second end of the left fixing component are connected beside another side of the supporting rod of the exercise fit car. The direct current voltage stabilizer is connected with the stabilizer connecting component, the direct current electric fan is connected with the electric fan connecting component, the electric fan connecting component is connected with the electric fan connecting clip, and the electric connecting clip is camped on the supporting rod of the exercise fit car. The direct current generator, the direct current voltage stabilizer, and the direct current electric fan are connected through a power line or a USB data line.

The stabilizer connecting component is connected with the supporting rod of the exercise fit car through a clamping mouth, the generator fixing component is connected with the baffle, and the rubber sleeve is sleeved on the rotating shaft of the direct current generator.

The present disclosure is reasonable in structure, does not need additional power supply, has an energy-saving effect, and is suitable for a plurality of exercise equipment. Moreover, the present disclosure enables physical and mental pleasure of people and meets more use requirements of the people.

BRIEF DESCRIPTION OF DRAWINGS

When considered in conjunction with the accompanying drawings, a more complete and better understanding of the present disclosure and many of its concomitant advantages can be readily learned by reference to the detailed description below, but the accompanying drawings illustrated herein are used to provide a further understanding of the present disclosure and form part of the present disclosure, and the schematic embodiments of the present disclosure and their descriptions are used to explain the present disclosure and do not constitute an undue limitation of the present disclosure, in which.

Figure 1:
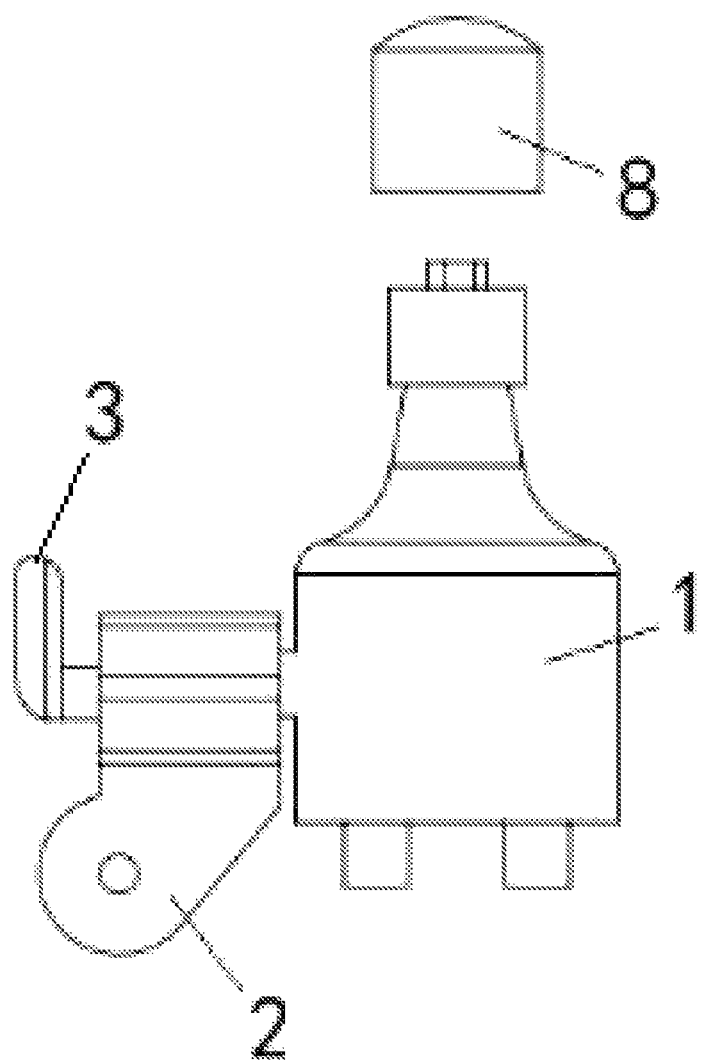
FIG. 1 is a structural schematic diagram of a direct current generator of the present disclosure.
Figure 2:
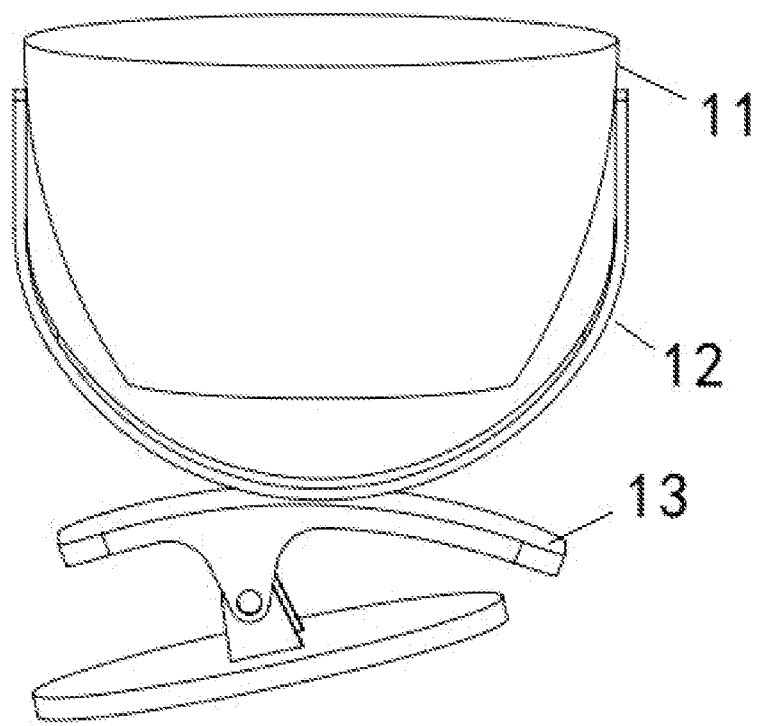
FIG. 2 is a structural schematic diagram of a direct current electric fan of the present disclosure.
Figure 3:
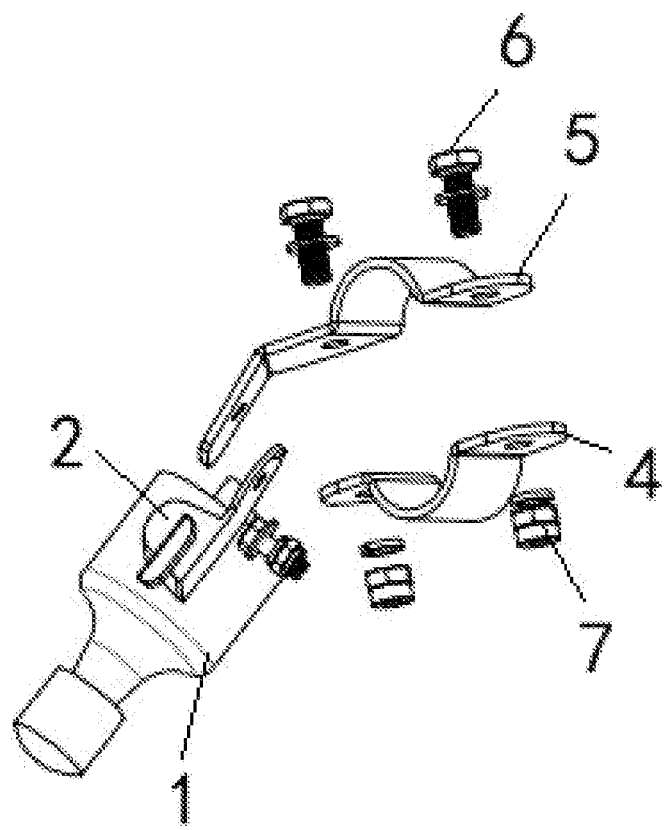
FIG. 3 is an assembled schematic diagram of the direct current generator of the present disclosure.
Figure 4:
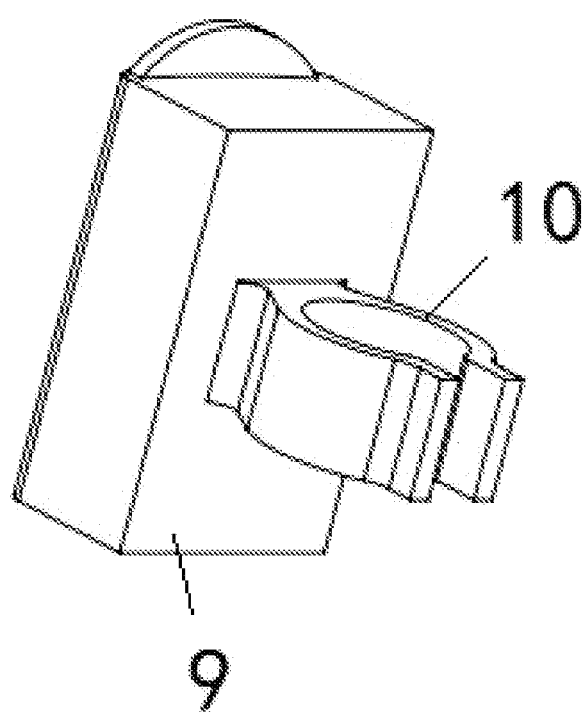
FIG. 4 is a structural schematic diagram of a direct current voltage stabilizer of the present disclosure.

The present disclosure is further described below in conjunction with the accompanying drawings and embodiments.

DETAILED DESCRIPTION

Obviously, many modifications and variations made by those who skilled in the art based on a purpose of the present disclosure fall within scopes of protection of the present disclosure.

It will be understood by those who skilled in the art that, unless specifically stated, singular forms "one", "a", "said" and "the" as used herein may also include a plural form. It should be further understood that the wording "include" as used in the specification of the present disclosure refers to the presence of said feature, integer, step, operation, component, and/or assembly, but does not exclude the presence or addition of one or more other features, integers, steps, operations, components, assemblies, and/or assemblies thereof. It should be understood that when a component or assembly is said to be "connected" to another component or assembly, it may be directly connected to other component or assembly, or there may be intermediate components or assemblies. The term "and/or" as used herein includes any and all combinations of one or more of associated listed items.

It will be understood by those who skilled in the art that, unless otherwise defined, all terms used herein (including technical terms and scientific terms) have the same meaning as generally understood by those of ordinary skill in the art to which they belong.

In order to facilitate the understanding of the embodiments, the following will be combined with further explanatory notes, and each embodiment does not constitute a limitation of the present disclosure.

As shown in FIGS. 1-8, the present disclosure provides a fan device for exercise equipment, including a direct current generator 1, a rubber sleeve 8, a generator fixing component 2, a baffle 3, a left fixing component 5, a right fixing component 4, a direct current voltage stabilizer 9, a stabilizer connecting component 10, a direct current electric fan 11, an electric fan connecting component 12, and an electric fan connecting clip 13. A rotating shaft of the direct current generator 1 is connected with the rubber sleeve 8, the direct current generator 1 is connected with the generator fixing component 2, the generator fixing component 2 is connected with the baffle 3, and the generator fixing component 2 is connected with an extension end of the left fixing component 5 through a bolt shaft and further capable of rotating. A first end of the right fixing component 4 and a first end of the left fixing component 5 are connected beside one side of a supporting rod of an exercise fit car through bolts 6 and nuts 7, and a second end of the right fixing component 4 and a second end of the left fixing component 5 are connected beside another side of the supporting rod of the exercise fit car. The direct current voltage stabilizer 9 is connected with the stabilizer connecting component 10, the stabilizer connecting component 10 is connected with the supporting rod of the exercise fit car through a clamping mouth. The direct current electric fan 11 is connected with the electric fan connecting component 12, the electric fan connecting component 12 is connected with the electric fan connecting clip 13, and the electric connecting clip 13 is camped on the supporting rod of the exercise fit car.

The direct current electric fan 11 is flexibly movable, and the electric fan connecting component 12 is rotatable with the direct current electric fan 11. A base of the direct current electric fan 11 (the electric fan connecting component 12) is connected with the electric fan connecting clip 13. The electric fan connecting clip 13 is directly clamped on a handlebar of an exercise fit car or an exercise bike, and can also be placed at a tail portion of the exercise fit car or the exercise bike, which can be used and connected at different angles.

Direct current generated by rotation friction of the direct current generator 1 through a rotor is subjected to constant voltage through the direct current voltage stabilizer 9 to ensure that an output voltage is stable in a certain range, thereby ensuring that the direct current electric fan 11 can work normally.

Figure 5:
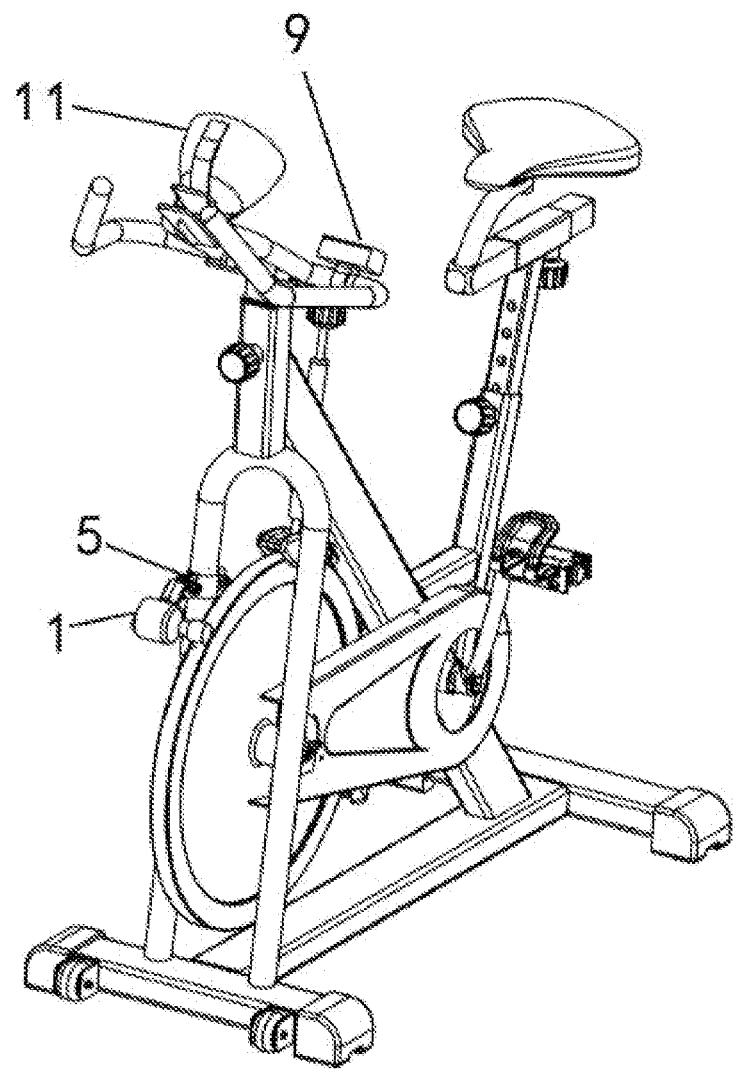
FIG. 5 is a schematic diagram of the present disclosure installed on a first exercise fit car.

A placement angle of the generator fixing component 2 the direct current generator 1 is flexibly adjustable, as shown in FIG. 5, a rotor end of the direct current generator 1 is ensured to match with a contact surface of a rotating wheel of the exercise fit car or the exercise bike, which realizes that the rotor end of the direct current generator 1 is effectively driven to rotate when the rotating wheel of the exercise fit car or the exercise bike rotate, so that the direct current generator 1 normally generates power. The rubber sleeve 8 is sleeved on the rotor end of the direct current generator 1 and plays a mute role. The left fixing component 5 and the right fixing component 4 are configured to fix the direct current generator 1 on the exercise fit car or the exercise bike, and the left fixing component 5 and the generator fixing component 2 rotate through a connecting shaft.

First, the left fixing component 5 and the right fixing component 4 are fixed on a main beam of the exercise fit car or the exercise bike and further on one side, close to the rotating wheel, of the exercise fit car or the exercise bike, the direct current generator 1 is connected with and fixed on the extension end of the left fixing component, adjusting the angles and the contact surface of the rotating wheel, and then the direct current generator 1 is tightly locked by the bolts 6 and the nuts 7.

The direct current stabilizer 9 is fixed on the handlebar of the exercise fit car through the bolts 6, then a power line connects the direct current generator 1 and the direct current stabilizer 9, the direct current electric fan 11 is disposed on the handlebar of the exercise fit car and the exercise bike, and finally a USB data line connects the direct current electric fan 11 and the direct current stabilizer 9.

The rotating wheel of the exercise fit car or the exercise bike is rotated through riding a crank pedal to drive the rotor of the direct current generator 1 to rotate and rub to generate the direct current, and then the direct current generated by friction is connected to the direct current stabilizer 9 through the power line, the direct current is regulated by the direct current stabilizer 9 and is output to the direct current electric fan 11, so that the direct current electric fan 11 starts to work.

Figure 6:
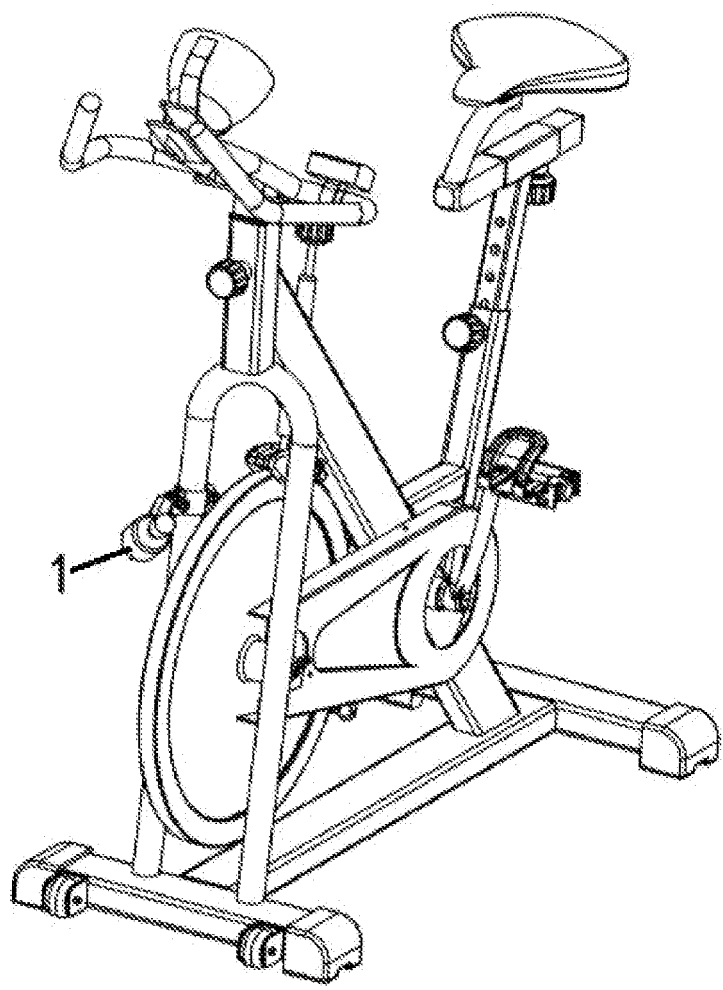
FIG. 6 is a schematic diagram of the present disclosure installed on a second exercise fit car.
Figure 7:
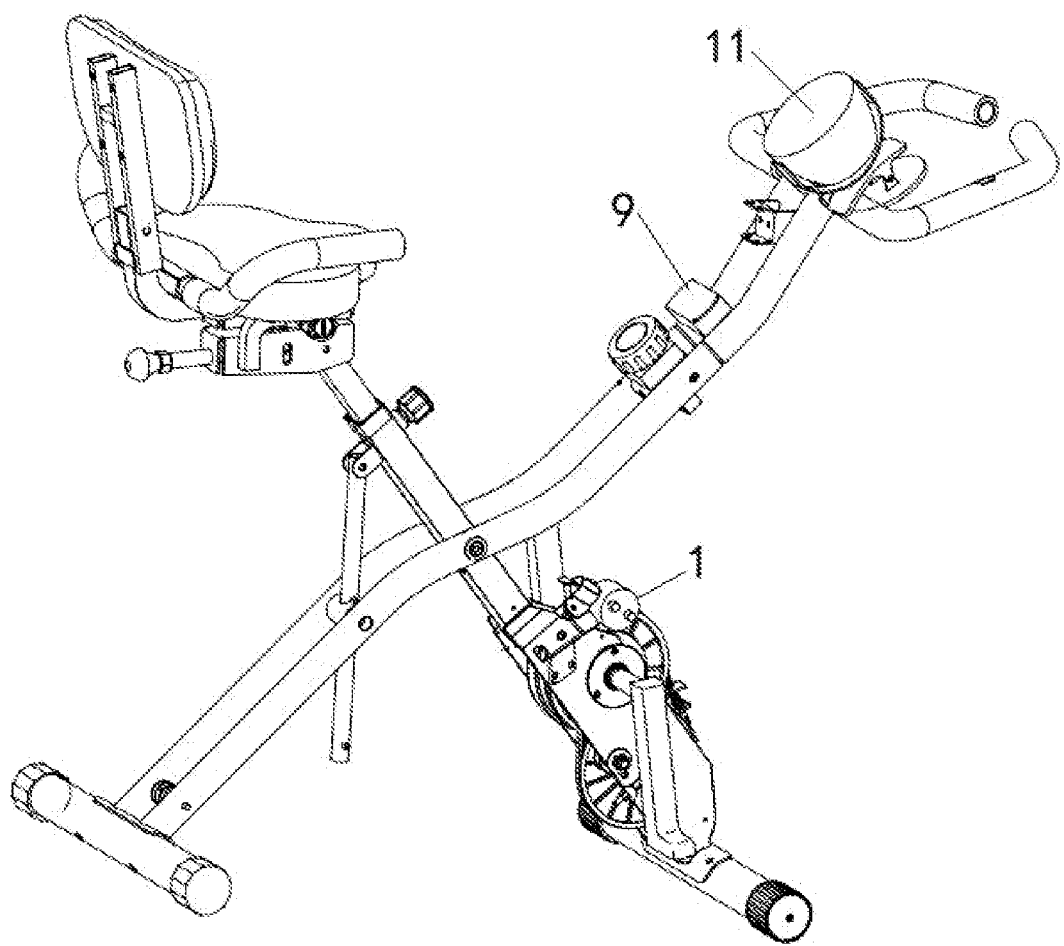
FIG. 7 is a schematic diagram of the present disclosure installed on a third exercise fit car.
Figure 8:
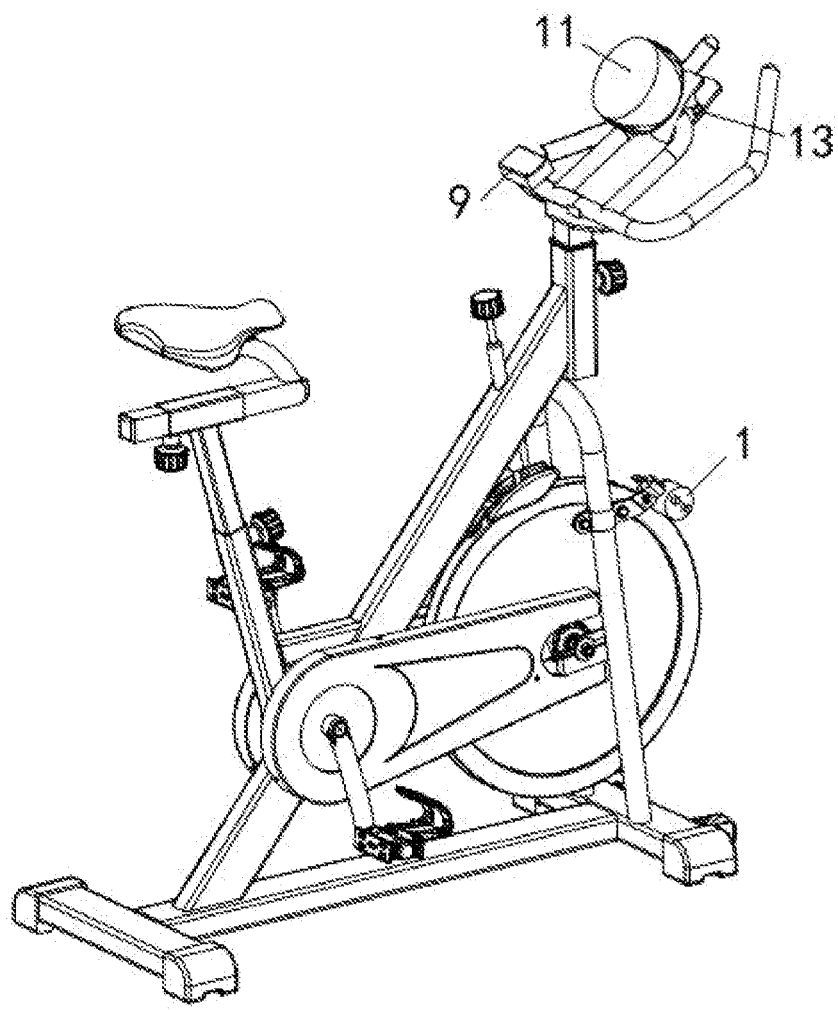
FIG. 8 is a schematic diagram of the present disclosure installed on a fourth exercise fit car.

As shown in FIG. 6, rotation between the direct current generator 1, the left fixing component 5, and the generator fixing component 2 is realized by the rotating shaft, the left fixing component 5 is blocked by the baffle 3, and the direct current generator 1 is separated with a contact surface of the rotating wheel of the exercise fit car or the exercise bike.

As mentioned above, the embodiment of the present disclosure has been described in detail, but there can be many variations as long as the inventive point and effect of the present disclosure are not departed from in substance, which is obvious to those who skilled in the art. Therefore, all such variations are included in the scopes of protection of the present disclosure.

What is claimed is:

1. A fan device for an exercise equipment, the exercise equipment is equipped with a rotating wheel that is operated manually by a user, comprising:
   a direct current generator;
   a rubber sleeve;
   a generator fixing component;
   a baffle;
   a left fixing component;
   a right fixing component;
   a direct current voltage stabilizer;
   a stabilizer connecting component;
   a direct current electric fan;
   an electric fan connecting component; and
   an electric fan connecting clip;
      wherein a rotating shaft of the direct current generator is connected with the rubber sleeve, the direct current generator is connected with the generator fixing component, the generator fixing component is connected with the baffle, and the generator fixing component is connected with an extension end of the left fixing component through a bolt shaft; the right fixing component, the left fixing component, right fixing component, and the left fixing component are used to connect the fan device to the exercise equipment; the direct current voltage stabilizer is connected with the stabilizer connecting component, the direct current electric fan is connected with the electric fan connecting component, the electric fan connecting component is connected with the electric fan connecting clip, and the electric connecting clip is camped on the exercise equipment; and the direct current generator, the direct current voltage stabilizer, and the direct current electric fan are connected through a power line or a USB data line;

the direct current generator generates a current to operate the fan device upon being driven via the rotating wheel of the exercise equipment.

2. The fan device according to claim 1, wherein the stabilizer connecting component is connected with the supporting rod of the exercise equipment through a clamping mouth.

3. The fan device according to claim, wherein the generator fixing component is connected with the baffle.

4. The fan device according to claim 1, wherein the rubber sleeve is sleeved on the rotating shaft of the direct current generator.

\* \* \* \* \*